US008406830B2

(12) United States Patent
Sakurai et al.

(10) Patent No.: US 8,406,830 B2

(45) Date of Patent: Mar. 26, 2013

(54) RADIO FREQUENCY SIGNAL TRANSMISSION SYSTEM, RADIO FREQUENCY SIGNAL TRANSMISSION CONNECTOR AND RADIO FREQUENCY SIGNAL TRANSMISSION CABLE

(75) Inventors: Hisao Sakurai, Saitama (JP); Yoshihide Shimpuku, Kanagawa (JP)

(73) Assignee: Sony Corporation, Tokyo (JP)

( * ) Notice: Subject to any disclaimer, the term of this patent is extended or adjusted under 35 U.S.C. 154(b) by 615 days.

(21) Appl. No.: 12/652,583

(22) Filed: Jan. 5, 2010

(65) Prior Publication Data

US 2010/0173595 A1 Jul. 8, 2010

(30) Foreign Application Priority Data

Jan. 8, 2009 (JP) ................................ P2009-002852

(51) Int. Cl.
*H04M 1/00* (2006.01)
*H04K 3/00* (2006.01)

(52) U.S. Cl. ..................................... 455/575.7; 343/906

(58) Field of Classification Search ............... 455/575.1, 455/575.7; 343/906
See application file for complete search history.

(56) References Cited

FOREIGN PATENT DOCUMENTS

| | | |
|---|---|---|
| JP | 07-245507 | 9/1995 |
| JP | 10-209725 | 8/1998 |
| JP | 2000-114815 | 4/2000 |
| JP | 2001-203510 | 7/2001 |
| JP | 2003-032009 | 1/2003 |
| JP | 2008-28523 | 2/2008 |
| JP | 2008-236365 | 10/2008 |

*Primary Examiner* — Lee Nguyen

(74) *Attorney, Agent, or Firm* — Finnegan, Henderson, Farabow, Garrett & Dunner, L.L.P.

(57) ABSTRACT

A radio frequency signal transmission system is provided which includes a radio frequency signal transmission connector including an antenna for radiating a radio frequency signal having a predetermined frequency band, and a first dielectric body made of a material having a predetermined first permittivity and having the antenna cast therein, and a radio frequency signal transmission cable including a dielectric transmission path formed of a second dielectric body made of a material having substantially the same second permittivity as the first permittivity of the first dielectric body of the radio frequency signal transmission connector. The radio frequency signal transmission connector is connected with the radio frequency signal transmission cable thereby to form a radio frequency signal transmission path through which the radio frequency signal radiated from the antenna is transmitted to the dielectric transmission path via the first dielectric body.

20 Claims, 12 Drawing Sheets

Prior Art

Prior Art

RADIO FREQUENCY SIGNAL TRANSMISSION SYSTEM, RADIO FREQUENCY SIGNAL TRANSMISSION CONNECTOR AND RADIO FREQUENCY SIGNAL TRANSMISSION CABLE

BACKGROUND OF THE INVENTION

1. Field of the Invention

The present invention relates to a radio frequency signal transmission system, radio frequency signal transmission connector and radio frequency signal transmission cable.

2. Description of the Related Art

In recent years, there has been typically utilized a transmission system using an electric signal or an optical transmission system using an optical fiber in order to transmit high-capacity signal at high speed. For example, a HDMI (High-Definition-Multimedia-Interface) cable using an electric signal is utilized for signal transmission in a TV receiver or video recorder. There is utilized optical communication using an optical fiber in a social infrastructure. There is disclosed in Japanese Patent Application Laid-Open No. 2008-28523 a transmission line technique utilizing a waveguide for transmitting a radio frequency electromagnetic field.

SUMMARY OF THE INVENTION

However, in a transmission path utilizing an electric signal, there was a problem that many problems occurred in the market, such as impedance mismatch relative to high speed. Further, in an optical transmission technique utilizing an optical fiber, the technique is difficult to widely spread in home appliances due to high cost of electric/optical converter. Furthermore, in order to actually use a transmission technique utilizing a radio frequency described in Japanese Patent Application Laid-Open No. 2008-28523 described above, there is a need to develop a transmission technique suitable for practical use such as connector or cable capable of transmitting a high-capacity signal at high speed between electronic devices.

In light of the foregoing, it is desirable for the present invention to provide a novel and improved radio frequency signal transmission system, radio frequency signal transmission connector and radio frequency signal transmission cable capable of realizing to transmit a high-capacity signal at high speed using a radio frequency signal.

According to an embodiment of the present invention, there is provided a radio frequency signal transmission system including a radio frequency signal transmission connector including an antenna for radiating a radio frequency signal having a predetermined frequency band, and a first dielectric body made of a material having a predetermined first permittivity and having the antenna cast therein, and a radio frequency signal transmission cable including a dielectric transmission path formed of a second dielectric body made of a material having substantially the same second permittivity as the first permittivity of the first dielectric body of the radio frequency signal transmission connector. The radio frequency signal transmission connector is connected with the radio frequency signal transmission cable thereby to form a radio frequency signal transmission path through which the radio frequency signal radiated from the antenna is transmitted to the dielectric transmission path via the first dielectric body.

With the structure, in the radio frequency signal transmission system, a space surrounding the antenna for radiating a radio frequency signal can be filled with the first dielectric body. A permittivity of the first dielectric body is set to be the same as that of the second dielectric body configuring the dielectric transmission path of the radio frequency signal transmission cable so that the radio frequency signal can be transmitted to the dielectric transmission path at the junction between the radio frequency signal transmission connector and the radio frequency signal transmission cable without being attenuated.

The first dielectric body of the radio frequency signal transmission connector may be connected with the dielectric transmission path of the radio frequency signal transmission cable via a buffer, and a permittivity of the buffer may be substantially the same as the first permittivity and the second permittivity.

The radio frequency signal transmission connector and the radio frequency signal transmission cable may further include a fit structure in which they are fit with each other during their connection, and the fit structures may be fit with each other when the radio frequency signal transmission connector and the radio frequency signal transmission cable are connected, thereby a contact face between the first dielectric body and the dielectric transmission path is positioned.

The radio frequency signal transmission connector may further include a radio wave absorbing member for absorbing a radio frequency signal radiated from the antenna on a predetermined face of the first dielectric body.

The radio frequency signal transmission connector may include multiple antennas and first dielectric bodies and the radio frequency signal transmission cable includes multiple dielectric transmission paths to form multiple radio frequency signal transmission paths.

The radio frequency signal transmission connector and the radio frequency signal transmission cable may further include an electric signal transmission path.

The radio frequency signal transmission connector and the radio frequency signal transmission cable may further include an optical signal transmission path.

The radio frequency signal may be a millimeter wave having a frequency band of 30 GHz to 300 GHz.

The first permittivity and the second permittivity may be about 2.2 to 2.6.

According to another embodiment of the present invention, there is provided a radio frequency signal transmission connector which is connected with a radio frequency signal transmission cable including a dielectric transmission path configured with a third dielectric body made of a material having a predetermined third permittivity, including an antenna for radiating a radio frequency signal having a predetermined frequency band, and a fourth dielectric body made of a material having substantially the same fourth permittivity as the third permittivity and having the antenna cast therein.

The radio frequency signal transmission connector may further include a buffer made of a material having substantially the same permittivity as the third permittivity and the fourth permittivity at a face of the fourth dielectric body contacting with the dielectric transmission path.

The radio frequency signal transmission connector may further include a fit structure which is fit with a fit structure provided in the radio frequency signal transmission cable to position the fourth dielectric body contacting with the dielectric transmission path during the connection with the radio frequency signal transmission cable.

The radio frequency signal transmission connector may further include a radio wave absorbing member for absorbing a radio frequency signal radiated from the antenna on a predetermined face of the fourth dielectric body.

The radio frequency signal transmission connector may include multiple fourth dielectric bodies having the antenna cast therein.

The radio frequency signal may be a millimeter wave having a frequency band of 30 GHz to 300 GHz.

The third permittivity and the fourth permittivity may be about 2.2 to 2.6.

According to another embodiment of the present invention, there is provided a radio frequency signal transmission cable which is connected with a radio frequency signal transmission connector including a fifth dielectric body made of a material having a predetermined fifth permittivity and having cast therein an antenna for radiating a radio frequency signal having a predetermined frequency band, including a dielectric transmission path formed of a sixth dielectric body made of a material having substantially the same sixth permittivity as the fifth permittivity.

The radio frequency signal transmission cable may further include a buffer made of a material having substantially the same permittivity as the fifth permittivity and the sixth permittivity at a face of the dielectric transmission path contacting with the fifth dielectric body.

The radio frequency signal transmission cable may further include a fit structure which is fit with a fit structure provided in the radio frequency signal transmission connector to position the dielectric transmission path contacting with the fifth dielectric body during the connection with the radio frequency signal transmission connector.

The fifth permittivity and the sixth permittivity may be about 2.2 to 2.6.

According to the present invention described above, it is possible to realize transmission of a high-capacity signal at high speed utilizing a radio frequency signal.

DETAILED DESCRIPTION OF THE EMBODIMENTS

Figure 1:
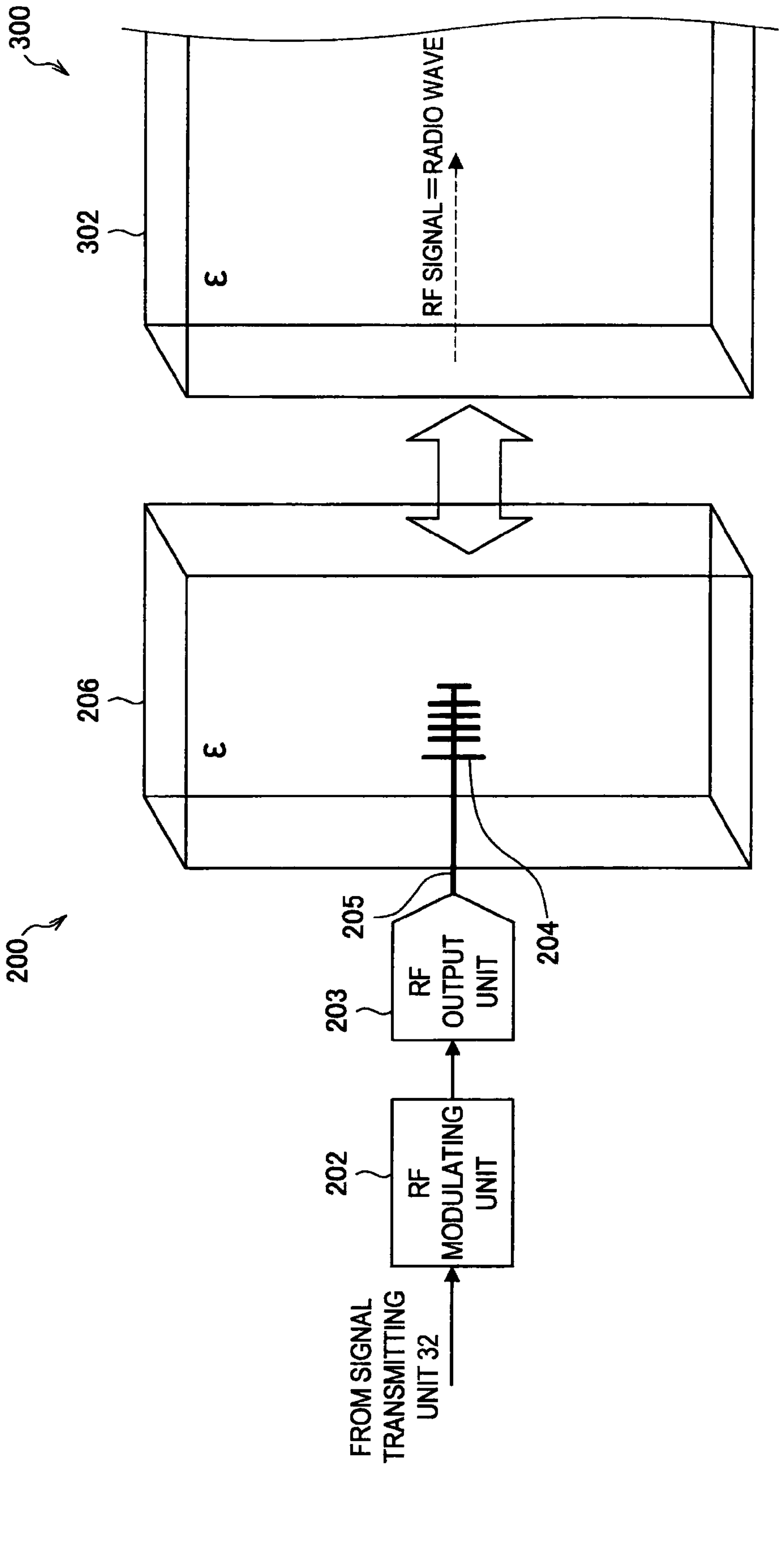
FIG. 1 is an explanatory diagram showing a basic schematic structure of a radio frequency signal transmission system according to one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order:

1. Outline of embodiment of the present invention
2. Basic structure of radio frequency signal transmission system
3. Variants
   - 3-1. Variant 1 (example of providing buffer at junction to improve transmission efficiency)
   - 3-2. Variant 2 (example of providing fit structure at junction to improve transmission efficiency)
   - 3-3. Variant 3 (example of radio frequency signal transmission cable 300 including multiple transmission paths)
   - 3-4. Variant 4 (example of providing radio wave absorbing member 214 to restrict reflected wave)
   - 3-5. Variant 5 (example of transmitting data recorded in IC chip)
4. Conclusions

1. OUTLINE OF EMBODIMENT OF THE PRESENT INVENTION

At first, the problem on the related art will be explicitly described and then the outline of a radio frequency signal transmission system according to one embodiment of the present invention will be described.

Figure 11:
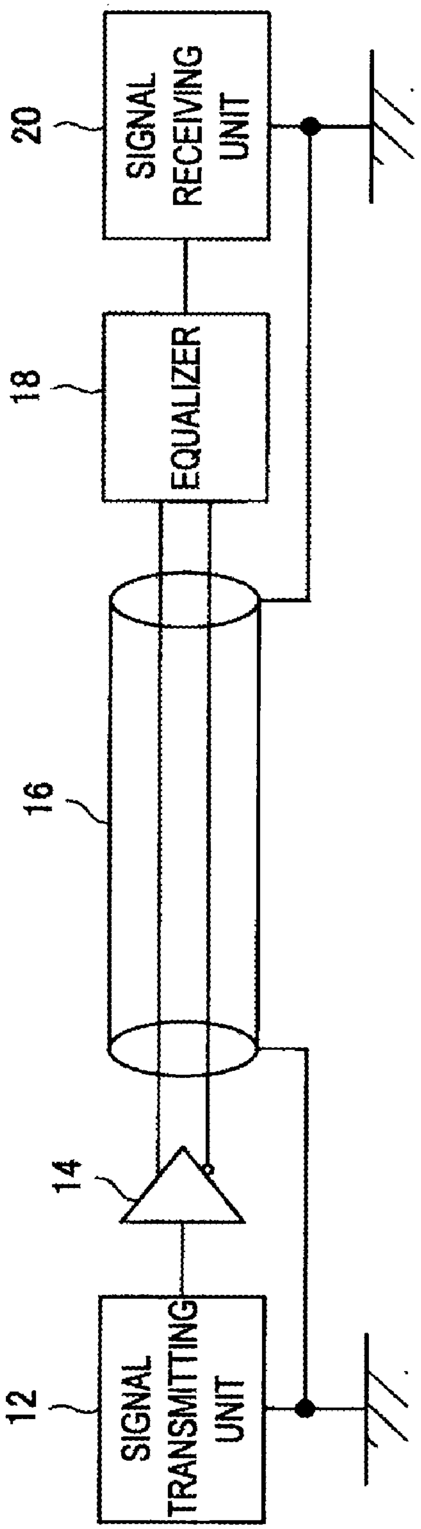
FIG. 11 is an explanatory diagram schematically showing a structure of a traditional electric signal transmission system.

In recent years, there has been typically utilized a transmission system using an electric signal or an optical transmission system using an optical fiber in order to transmit a high-capacity signal at high speed. FIG. 11 is an explanatory diagram schematically showing an electric signal transmission technique. As shown in FIG. 11, an electric signal transmitted from a signal transmitting unit 12 is transmitted via an amplifier 14 or the like to a transmission cable 16. Thereafter, the electric signal transmitted through the transmission cable 16 is transmitted via an equalizer 18 or the like to a signal receiving unit 20.

Such an electric signal transmission technique can be utilized to transmit an electric signal between various electric devices. In recent years, there has been widely used a HDMI (High-Definition-Multimedia-Interface) connector/cable or the like capable of bidirectionally transmitting speech, video and control signals. However, there is a problem such as impedance mismatching relative to high speed, and there are many problem as a transmission technique for transmitting a high-capacity signal at high speed.

Figure 12:
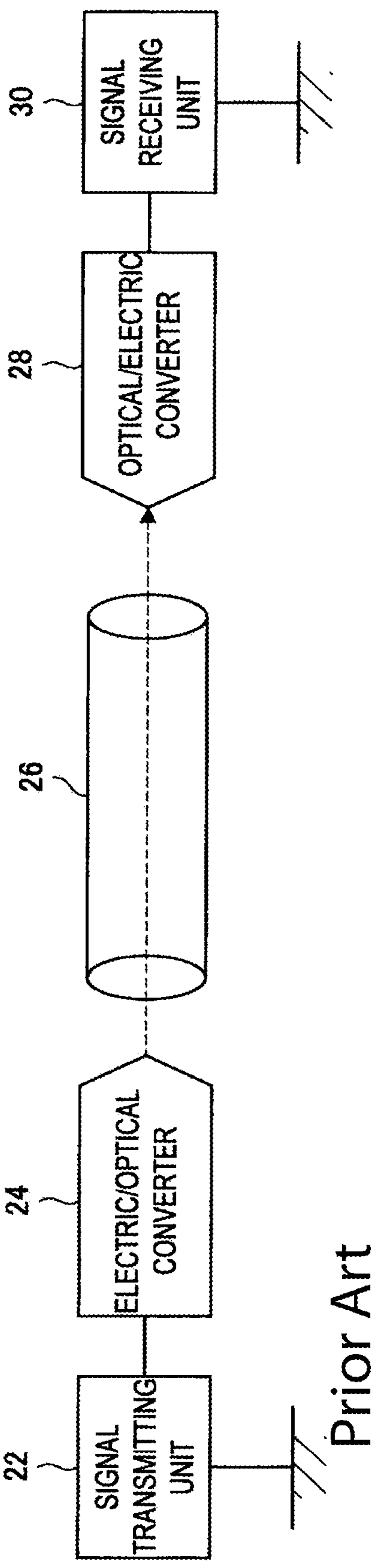
FIG. 12 is an explanatory diagram schematically showing a structure of a traditional optical signal transmission system.

FIG. 12 is an explanatory diagram schematically showing an optical signal transmission technique. As shown in FIG. 12, in the case of a signal transmission system using an optical signal, an electric signal transmitted from a signal transmitting unit 22 is converted into an optical signal by an electric/optical converter 24 and then transmitted via an optical cable 26. Thereafter, the optical signal transmitted through the optical cable 26 is converted into an electric signal by an optical/electric converter 28 and then transmitted to a signal receiving unit 30.

Optical communication using such an optical signal transmission technique enables to transmit high-capacity data at high speed. However, since a cost for the electric/optical converter 24 or the optical/electric converter 28 is high, there is a problem that the optical communication is widely used in the social infrastructure but is not widely used in home appliances.

Thus, the present inventor has eagerly made researches in order to solve the above problems and reached a signal transmission system made of a connector and a cable capable of transmitting a high-capacity signal at high speed by utilizing a radio frequency (RF) signal. Particularly, the RF signal referred to as so-called millimeter wave having a band of several tens GHz has a characteristic of being capable of easily passing through a waveguide or dielectric transmission path. Thus, a millimeter wave is particularly utilized among the radio frequency signals, thereby realizing a system for transmitting a high-capacity signal at higher speed.

The "millimeter wave" refers to an electromagnetic wave having a wave length of 10 mm to 1 mm and a frequency of 30 GHz to 300 GHz. The frequency used for communication in cell phones is on the order of 1.7 GHz to 2 GHz. The millimeter wave has several tens to several hundreds times of the frequency. Thus, a much wider band can be used than the band used in the current wireless LAN standard. For example, ultrafast wireless communication can be made beyond 1 Gbps in short distance communication.

Figure 13:
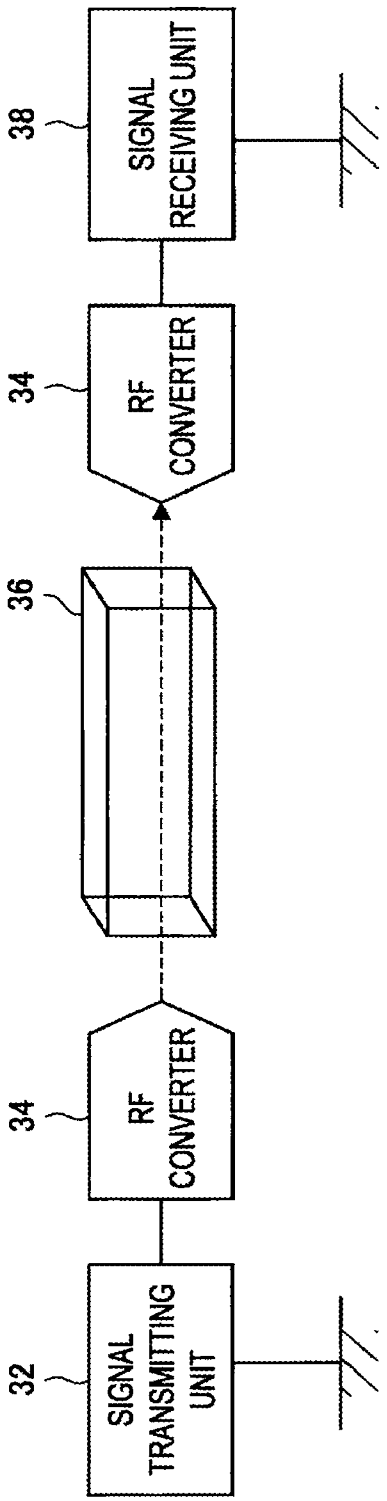
FIG. 13 is an explanatory diagram schematically showing a structure of a traditional RF signal transmission system utilizing a dielectric transmission path.

FIG. 13 is an explanatory diagram showing a typical schematic structure when using a dielectric transmission path to transmit a RF signal. As shown in FIG. 13, an electric signal transmitted from a signal transmitting unit 32 is converted into a RF signal (referred to as millimeter wave below) having a millimeter wave band by a RF converter 34. Thereafter, the millimeter wave is transmitted through a dielectric transmission cable 36 made of a dielectric body and then demodulated into the original electric signal from the millimeter wave RF signal by the RF converter 34 to be transmitted to a signal receiving unit 38.

Figure 14:
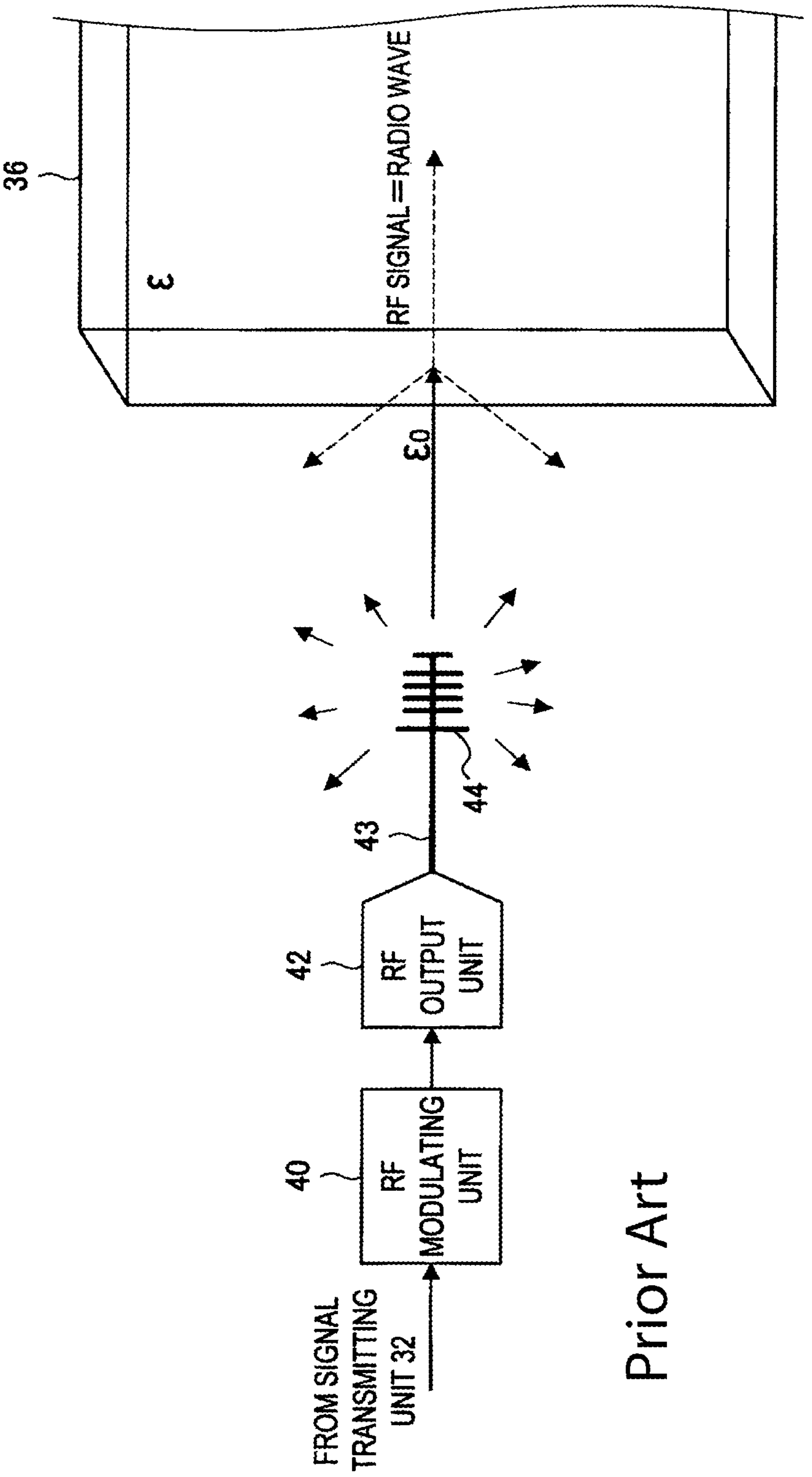
FIG. 14 is an explanatory diagram showing a concept in which a millimeter wave radiated from an antenna is input into a dielectric body in the traditional RF signal transmission system utilizing a dielectric transmission path.

FIG. 14 is an explanatory diagram showing a concept in which part of the millimeter wave is incident into the dielectric transmission cable 36. As shown in FIG. 14, the RF converter 34 mainly includes a RF modulating unit 40 for modulating an electric signal into a millimeter wave, a RF output unit 42 for amplifying a millimeter wave and an antenna 44 for radiating a millimeter wave. A millimeter wave radiated from the antenna 44 connected to the RF output unit 42 via a signal line 43 reaches an incident face of the dielectric transmission cable 36. At this time, since a permittivity $\in_0$ of the space surrounding the antenna 44 is different from a permittivity $\in$ of the dielectric transmission cable 36, the millimeter wave is interface-reflected at the incident face of the dielectric transmission cable 36. Additionally, a similar phenomenon occurs also at an exit face of the dielectric transmission cable 36. Such a phenomenon is known as phenomenon indicated by the Fresnel equation.

Even when a millimeter wave is vertically incident from the first dielectric body having a certain permittivity into the second dielectric body having another permittivity, the millimeter wave reflects at the interface of the dielectric body. A reflectivity and a transmissivity of the millimeter wave at this time are calculate from the following equation (1) and equation (2).

[Formula 1]

$$\text{Reflectivity} = \left\{ \frac{\sqrt{\varepsilon 1/\mu 1} - \sqrt{\varepsilon 2/\mu 2}}{\sqrt{\varepsilon 1/\mu 1} + \sqrt{\varepsilon 2/\mu 2}} \right\}^2 \qquad \text{Equation (1)}$$

[Formula 2]

$$\text{Transmissivity} = \frac{4\sqrt{\varepsilon 1 \cdot \varepsilon 2/\mu 1 \cdot \mu 2}}{\left\{\sqrt{\varepsilon 1/\mu 1} + \sqrt{\varepsilon 2/\mu 2}\right\}^2} \qquad \text{Equation (2)}$$

Where, $\in 1$ denotes a permittivity of the first dielectric body and $\in 2$ denotes a permittivity of the second dielectric body. $\mu 1$ denotes a specific permeability of the first dielectric body and $\mu 2$ denotes a specific permeability of the second dielectric body. Typically, in the case of a resin material such as plastic, the specific permeability is about 1 and the calculation equations (1) and (2) for the reflectivity and the transmissivity are simplified and calculated as in the following equations (3) and (4).

[Formula 3]

$$\text{Reflectivity} = \left\{ \frac{\sqrt{\varepsilon 1} - \sqrt{\varepsilon 2}}{\sqrt{\varepsilon 1} + \sqrt{\varepsilon 2}} \right\}^2 \qquad \text{Equation (3)}$$

[Formula 4]

$$\text{Transmissivity} = \frac{4\sqrt{\varepsilon 1 \cdot \varepsilon 2}}{\left\{\sqrt{\varepsilon 1} + \sqrt{\varepsilon 2}\right\}^2} \qquad \text{Equation (4)}$$

For example, consider, from the above equations (3) and (4), the reflectivity and the transmissivity when a millimeter wave is vertically incident from a certain space into a dielectric body. The specific permittivity of air is about 1 so that $\in 1=1$ is assumed. Further, a resin material is assumed for the permittivity of the second dielectric body so that $\in 2=3$ is assumed. In this case, the reflectivity is about 7% and the transmissivity is about 93% from the above equation (3). In other words, this means that even when the millimeter wave radiated from the antenna 40 is vertically incident into the incident face of the dielectric transmission cable 36, about 7% thereof is reflected.

A radio frequency signal transmission connector 200 and a radio frequency signal transmission cable 300 configuring the radio frequency signal transmission system according to the embodiment of the present invention can eliminate the above problems. The radio frequency signal transmission system according to the present embodiment will be described below in detail.

2. BASIC STRUCTURE OF RADIO FREQUENCY SIGNAL TRANSMISSION SYSTEM

FIG. 1 is an explanatory diagram showing a basic schematic structure of the radio frequency signal transmission system according to the present embodiment. As shown in FIG. 1, the radio frequency signal transmission connector 200 (also referred to as transmission connector 200 below) and the radio frequency signal transmission cable 300 (also referred to as transmission cable 300 below) are connected so that the radio frequency signal transmission system can transmit a radio frequency signal. Only the transmission connector 200 at the side of transmitting a radio frequency signal is shown in the explanatory diagram of FIG. 1 for convenient explanation but a similar transmission connector 200 is configured at the transmission signal exit side in the transmission cable 300.

As shown in FIG. 1, the transmission connector 200 includes therein a RF modulating unit 202 for modulating an electric signal transmitted from the signal transmitting unit 32 into a millimeter wave, a RF output unit 203 for amplifying a millimeter wave and an antenna 204 connected to the RF output unit 203 via the signal line 43. The antenna 204 is configured to be cast into a first dielectric body 206 having a predetermined permittivity ∈ as shown in FIG. 1. In other words, the space surrounding the antenna 204 is filled with the first dielectric body 206 having the permittivity ∈. The antenna 204 is designed depending on the permittivity ∈ of the dielectric body 206 or a requested specification and is not limited to a specific shape or size.

The radio frequency signal transmission cable 300 according to the present embodiment includes a dielectric transmission path 302 for transmitting a millimeter wave. Further, the dielectric body forming the dielectric transmission path 302 is made of a material having the same permittivity as the permittivity ∈ of the dielectric body 206 of the transmission connector 200.

When the transmission connector 200 and the transmission cable 300 are joined, the dielectric body 206 and the dielectric transmission path 302 both having the same permittivity ∈ are tightly attached to each other. Consequently, the millimeter wave radiated from the antenna 204 will be transmitted through the radio frequency signal transmission path formed by the dielectric body 206 and the dielectric transmission path 302. In other words, the millimeter wave radiated from the antenna 204 is incident into the dielectric transmission path 302 having the permittivity ∈ via the dielectric body 206 having the permittivity ∈. At this time, the permittivities of the dielectric body 206 and the dielectric transmission path 302 are the same so that the interface reflection at the contact face between the dielectric body 206 and the dielectric transmission path 302 can be prevented.

As described above, the dielectric body 206 having the antenna 204 cast therein is set in its permittivity to be the same as the dielectric body configuring the dielectric transmission path 302 of the transmission cable 300, thereby restricting attenuation of an input signal of the millimeter wave at the junction between the transmission connector 200 and the transmission cable 300. Further, a similar effect can be obtained also at the exit face of the transmission cable 300. A similar transmission cable 300 is connected to the exit side of the transmission cable 300. Consequently, the dielectric body 206 and the dielectric transmission path 302 both having the same permittivity ∈ are tightly attached to each other at the exit side of the transmission cable 300. In other words, the millimeter wave transmitted through the dielectric transmission path 302 of the transmission cable 300 is incident into the dielectric body 206 having the same permittivity ∈ as the dielectric transmission path 302. Thus, the attenuation of the input signal of the millimeter wave can be restricted at the junction between the exit side of the transmission cable 300 and the transmission connector 200.

In consideration of the transmission efficiency of the transmission cable 300, the dielectric body 206 and the dielectric body configuring the dielectric transmission path 302 are preferably made of a polypropylene-based material. This is because a dielectric loss is 0.01 to 0.001 in the case of a polypropylene-based material so that the transmission path having a low transmission loss can be realized. In this case, the permittivity ∈ is about 2.2 to 2.6. Of course, the material and the permittivity ∈ forming the dielectric body 206 and the dielectric body configuring the dielectric transmission path 302 are not limited thereto. For example, the dielectric bodies made of various materials or permittivities may be utilized depending on a requested specification or cost, of course.

As stated above, since the antenna 204 for radiating a millimeter wave is cast into the dielectric body 206 in the radio frequency signal transmission connector 200 according to the present embodiment, the space surrounding the antenna 204 can be filled with the dielectric body 206. Further, the permittivity of the dielectric body 206 is set to be the same as the permittivity of the dielectric body configuring the dielectric transmission path 302 of the transmission cable 300, thereby preventing the interface reflection of the millimeter wave at the junction between the transmission connector 200 and the transmission cable 300. In other words, in the radio frequency signal transmission system according to the present embodiment, the attenuation of the millimeter wave can be restricted at the junction between the transmission connector 200 and the transmission cable 300. As a result, the radio frequency signal transmission system according to the present embodiment can be utilized to realize the transmission of a high-capacity signal at high speed utilizing a radio frequency signal.

3. VARIANTS

The dielectric body 206 having the antenna 204 of the transmission connector 200 cast therein is set in its permittivity to be the same as the dielectric body configuring the dielectric transmission path 302 of the transmission cable 300 so that the radio frequency signal transmission system according to the present embodiment can have the above characteristics. The radio frequency signal transmission system according to the present embodiment includes various structures in addition to the above structure to have the above characteristics, thereby transmitting a high-capacity signal at higher speed. There will be described below variants capable of further improving signal transmission efficiency in the radio frequency signal transmission system according to the present embodiment.

[3-1. Variant 1 (Example of Providing Buffer at Junction to Improve Transmission Efficiency)]

As stated above, in the radio frequency signal transmission system according to the present embodiment, the attenuation of a millimeter wave can be restricted at the junction between the transmission connector 200 and the transmission cable 300. It is desirable that the tightness of the junction between the transmission connector 200 and the transmission cable 300 is higher in order to further restrict the attenuation of a millimeter wave at the junction between the transmission connector 200 and the transmission cable 300. In a radio frequency signal transmission system according to variant 1, the tightness of the junction between the transmission connector 200 and the transmission cable 300 is further improved, thereby further improving the signal transmission efficiency.

Figure 2:
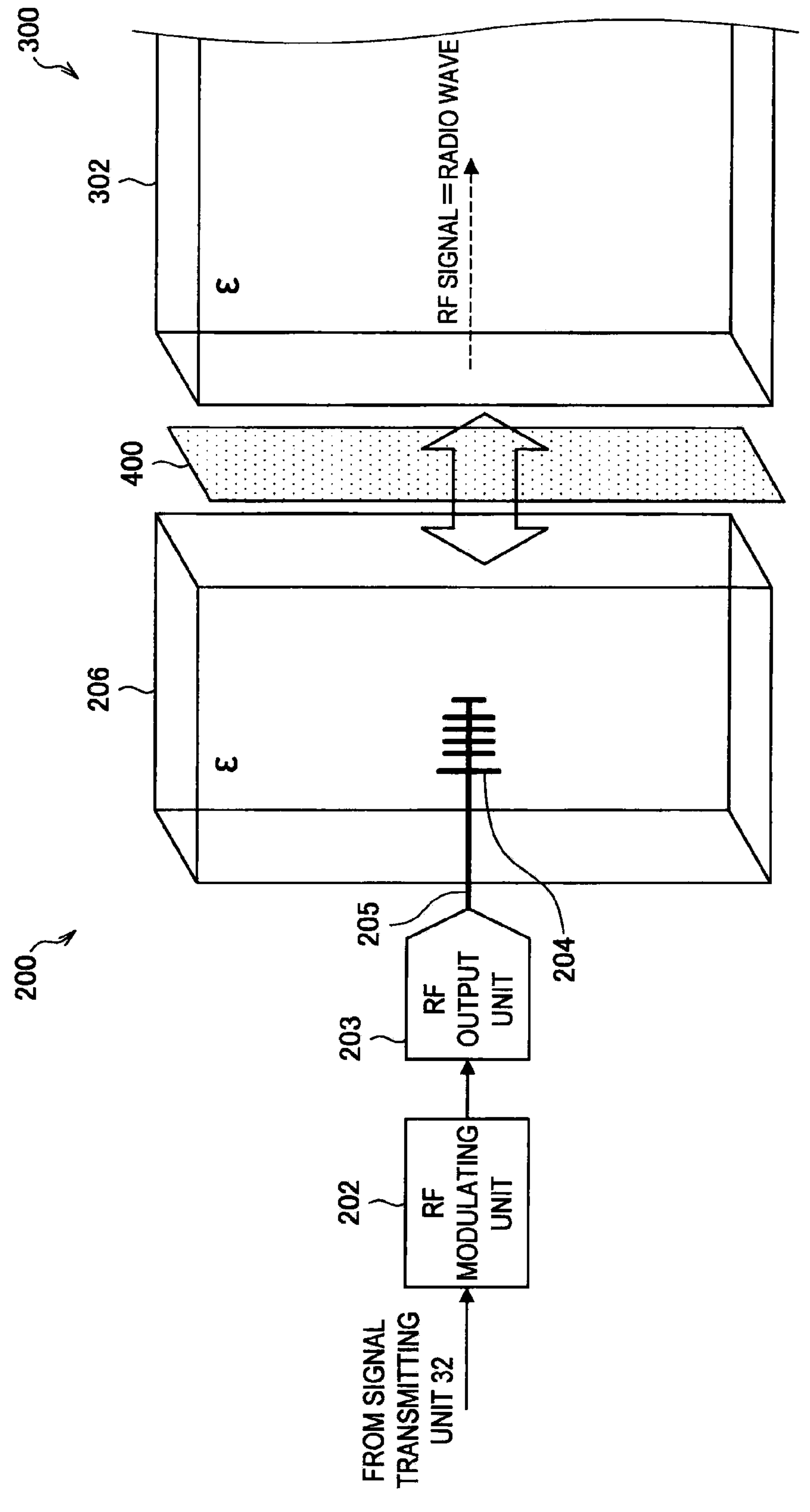
FIG. 2 is an explanatory diagram showing a schematic structure of a radio frequency signal transmission system according to variant 1.

FIG. 2 is an explanatory diagram showing a schematic structure of a radio frequency signal transmission system according to variant 1. As shown in FIG. 2, a buffer 400 is provided at the junction between the transmission connector 200 and the transmission cable 300. The buffer 400 is provided in order to improve the tightness of the junction between the dielectric body 206 of the transmission connector 200 and the dielectric transmission path 302 of the transmission cable 300. Thus, the buffer 400 is desirably made of an elastic body capable of filling a gap of the junction between the dielectric body 206 of the transmission connector 200 and the dielectric transmission path 302 of the transmission cable 300.

Further, a millimeter wave radiated from the antenna 204 is incident from the dielectric body 206 of the transmission connector 200 via the buffer 400 into the dielectric transmission path 302 of the transmission cable 300. Thus, the buffer 400 is made of a material having the same permittivity as the dielectric body 206 and the dielectric body configuring the dielectric transmission path 302 in order to restrict the attenuation of the millimeter wave at the junction between the dielectric body 206 of the transmission connector 200 and the dielectric transmission path 302 of the transmission cable 300.

For example, the buffer 400 may be made of a polypropylene-based material having the permittivity $\in$ of 2.2 to 2.6 similarly as the dielectric body 206 of the transmission connector 200 and the dielectric body configuring the dielectric transmission path 302 of the transmission cable 300. Of course, the material and the permittivity $\in$ forming the buffer 400 are not limited thereto. In other words, an appropriate buffer 400 may be applied depending on the material nature and the permittivities of the dielectric body 206 and the dielectric body configuring the dielectric transmission path 302, which are determined depending on a requested specification or cost.

The buffer 400 may be provided in the dielectric body 206 of the transmission connector 200, in the dielectric transmission path 302 of the transmission cable 300 or in both the dielectric body 206 and the dielectric transmission path 302.

As stated above, in the radio frequency signal transmission system according to variant 1, the dielectric body 206 of the transmission connector 200 is joined with the dielectric transmission path 302 of the transmission cable 300 via the buffer 400. Thus, the tightness of the junction between the dielectric body 206 of the transmission connector 200 and the dielectric transmission path 302 of the transmission cable 300 can be improved. Further, the permittivity of the buffer 400 is set to be substantially the same as the permittivities of the dielectric body 206 of the transmission connector 200 and the dielectric body configuring the dielectric transmission path 302 of the transmission cable 300, thereby restricting the attenuation of the millimeter wave at the junction. Consequently, the radio frequency signal transmission system according to variant 1 is utilized to improve the transmission efficiency of the millimeter wave between the transmission connector 200 and the transmission cable 300 and to transmit a high-capacity signal at high speed.

[3-2. Variant 2 (Example of Providing Fit Structure at Junction to Improve Transmission Efficiency)]

In the radio frequency signal transmission system according to variant 1 described above, the transmission connector 200 and the transmission cable 300 are joined with each other via the buffer 400, thereby improving the tightness of the junction between the transmission connector 200 and the transmission cable 300. However, even if the tightness between the dielectric body 206 and the dielectric transmission path 302 can be improved, if the positional accuracy of the dielectric body 206 and the dielectric transmission path 302 during the junction is bad, the transmission efficiency can be lowered. Thus, in the radio frequency signal transmission system according to variant 2, the transmission connector 200 and the transmission cable 300 have a fit structure, thereby improving the positional accuracy of the dielectric body 206 and the dielectric transmission path during the junction and further improving the signal transmission efficiency.

Figure 3:
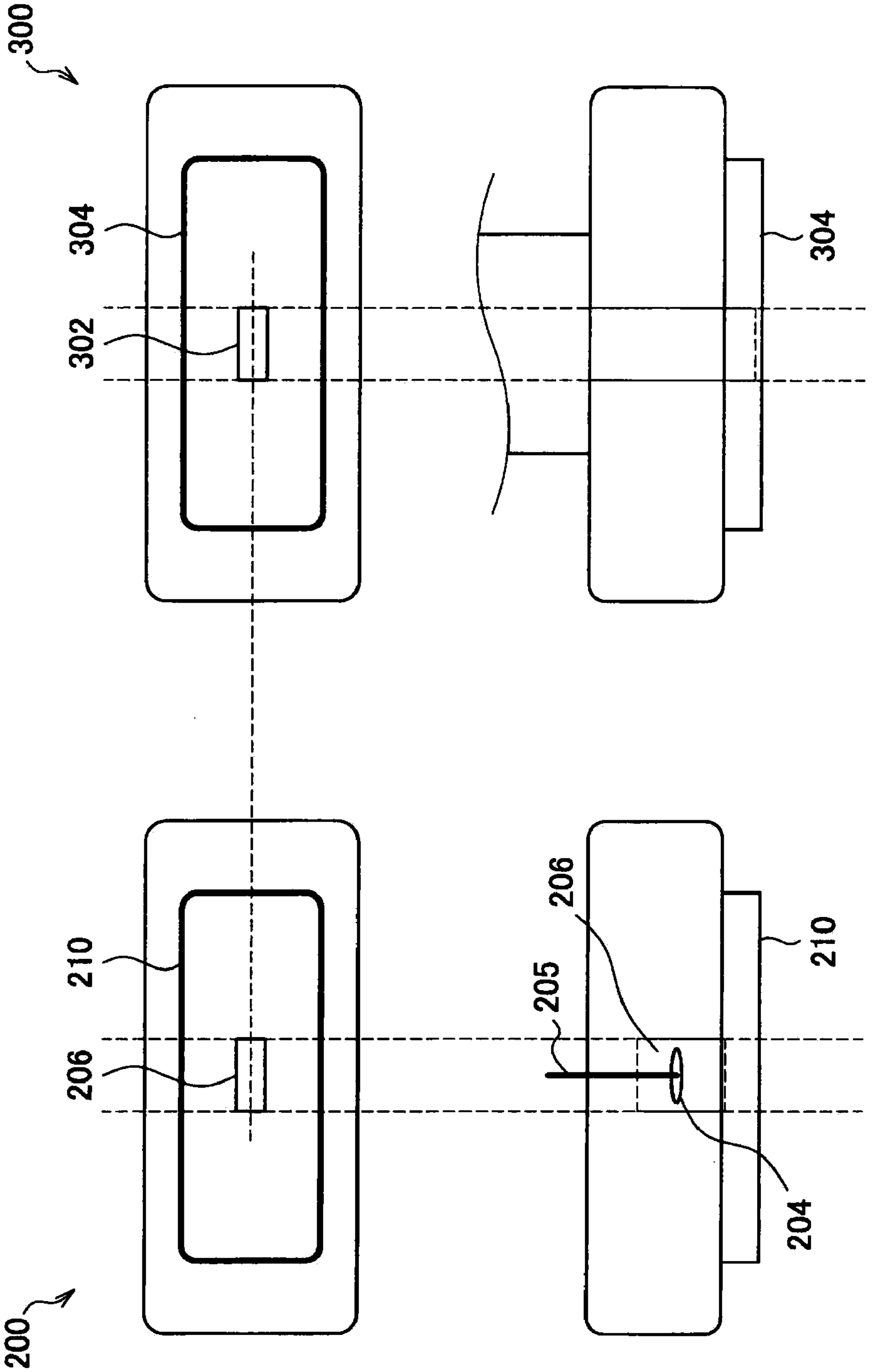
FIG. 3 is an explanatory diagram showing a schematic structure of a fit structure in a radio frequency signal transmission system according to variant 2.

FIG. 3 is an explanatory diagram showing a schematic structure of the fit structure provided in the transmission connector 200 and the transmission cable 300 in the radio frequency signal transmission system according to variant 2. As shown in FIG. 3, a first fitting unit 210 is formed in the transmission connector 200 and a second fitting unit 304 is formed in the transmission cable 300.

Figure 4:
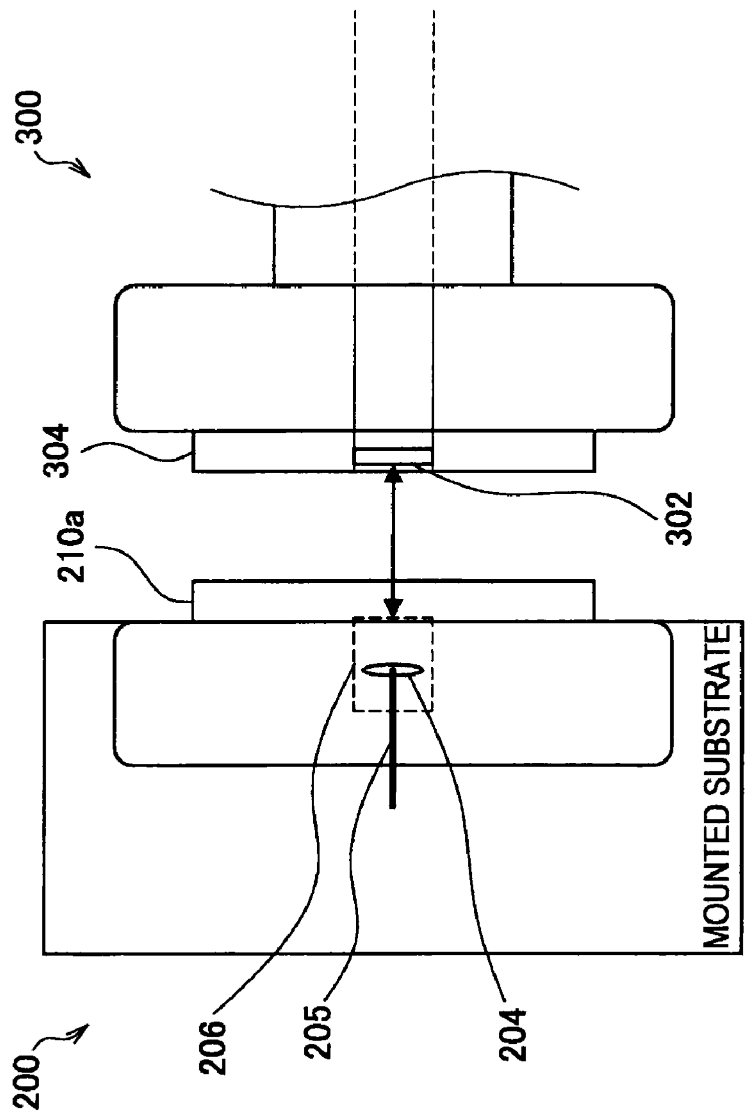
FIG. 4 is an explanatory diagram showing how a transmission connector 200 is fit with a transmission cable 300 in the radio frequency signal transmission system according to variant 2.

FIG. 4 is an explanatory diagram showing how the transmission connector 200 and the transmission cable 300 are joined with each other in the radio frequency signal transmission system according to variant 2. As shown in FIG. 4, when the transmission connector 200 is connected to the transmission cable 300, the first fitting unit 210 and the second fitting unit 304 are fit with each other. In this manner, the first fitting unit 210 and the second fitting unit 304 are fit with each other so that the dielectric body 206 and the dielectric transmission path 302 can be tightly attached with each other with excellent accuracy. Consequently, it is possible to further improve the transmission efficiency of the millimeter wave transmitted from the transmission connector 200 to the transmission cable 300.

The first fitting unit 210 and the second fitting unit 304 are not limited to a specific shape or size. In other words, the first fitting unit 210 and the second fitting unit 304 have only to be fit with each other when the transmission connector 200 and the transmission cable 300 are joined with each other, and need to only position the dielectric body 206 and the dielectric transmission path 302. For example, as shown in FIGS. 3 and 4, the first fitting unit 210 and the second fitting unit 304 have a flange shape with a different opening area so that the first fitting unit 210 and the second fitting unit 304 can be fit with each other. Thus, as long as the first fitting unit 210 and the second fitting unit 304 are fit with each other so that the dielectric body 206 and the dielectric transmission path 302 can be tightly attached with each other with excellent accuracy, the first fitting unit 210 and the second fitting unit 304 are not limited to a specific shape or size.

As stated above, in the radio frequency signal transmission system according to variant 2, the first fitting unit 210 and the second fitting unit 304 are fit with each other so that the dielectric body 206 of the transmission connector 200 and the dielectric transmission path 302 of the transmission cable 300 can be tightly attached at a precise position. Thus, it is possible to restrict the attenuation of the millimeter wave at the junction between the dielectric body 206 of the transmission connector 200 and the dielectric transmission path 302 of the transmission cable 300. Consequently, the radio frequency signal transmission system according to variant 2 is utilized to improve the transmission efficiency of the millimeter wave between the transmission connector 200 and the transmission cable 300 and to transmit a high-capacity signal at high speed. It is naturally possible to provide the buffer 400 described in variant 1 in the transmission connector 200 and/or the transmission cable 300 according to variant 2. Thus, the transmission efficiency of the millimeter wave between the transmission connector 200 and the transmission cable 300 can be further improved.

[3-3. Variant 3 (Example of Radio Frequency Signal Transmission Cable 300 Including Multiple Transmission Paths)]

There has been described in the above embodiment the example in which one radio frequency signal transmission path is provided along with the transmission connector 200 and the transmission cable 300. In the radio frequency signal transmission system according to variant 3 described later, the transmission connector 200 and the transmission cable 300 have multiple radio frequency signal transmission paths, thereby increasing the capacity of data to be transmitted.

Figure 5:
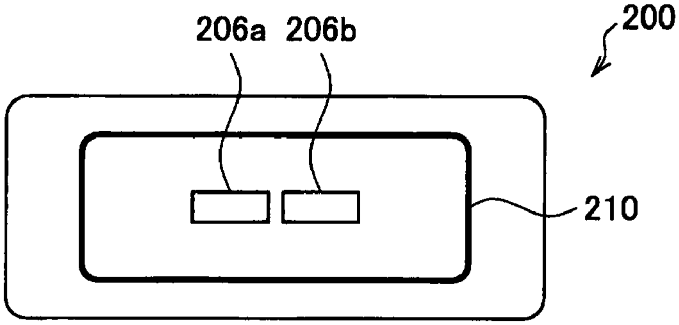
FIG. 5 is an explanatory diagram showing a schematic structure of the transmission connector 200 in a radio frequency signal transmission system according to variant 3.

FIG. 5 is an explanatory diagram showing a schematic structure of the transmission connector 200 in the radio frequency signal transmission system according to variant 3. As shown in FIG. 5, the transmission connector 200 includes two dielectric bodies 206*a* and 206*b*. The antenna 204 for radiating a millimeter wave is cast in each dielectric body 206*a*, 206*b*.

Only the transmission connector 200 is shown in FIG. 5, but the transmission cable 300 connected with the transmission connector 200 also includes two dielectric transmission paths 302 similarly. In other words, the radio frequency signal transmission system shown in FIG. 5 utilizes the two radio frequency signal transmission paths to increase a data transfer capacity.

Figure 6:
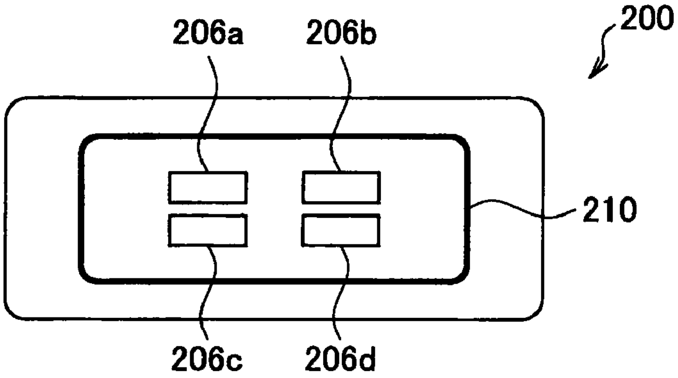
FIG. 6 is an explanatory diagram showing another schematic structure of the transmission connector 200 in the radio frequency signal transmission system according to variant 3.

The number of dielectric bodies 206 provided in the transmission connector 200 is not limited to 2. FIG. 6 is an explanatory diagram showing another schematic structure of the transmission connector 200 in the radio frequency signal transmission system according to variant 3. In the example shown in FIG. 6, the transmission connector 200 includes four dielectric bodies 206*a*, 206*b*, 206*c* and 206*d*. The antenna 204 for radiating a millimeter wave is cast in each dielectric body 206*a*, 206*b*, 206*c*, 206*d*.

In other words, the radio frequency signal transmission system shown in FIG. 6 utilizes the four radio frequency signal transmission paths to further increase the data transfer capacity than the radio frequency signal transmission system shown in FIG. 5. In this manner, the number of radio frequency signal transmission paths provided in the transmission connector 200 and the transmission cable 300 is not limited to a specific number. In other words, there may be employed a structure in which the permittivities of the dielectric bodies of the transmission connector 200 and the transmission cable 300 are substantially the same and the antenna 204 is cast in the dielectric body 206 of the transmission connector 200, and the number of radio frequency signal transmission paths can be appropriately selected depending on a requested specification or cost.

Figure 7:
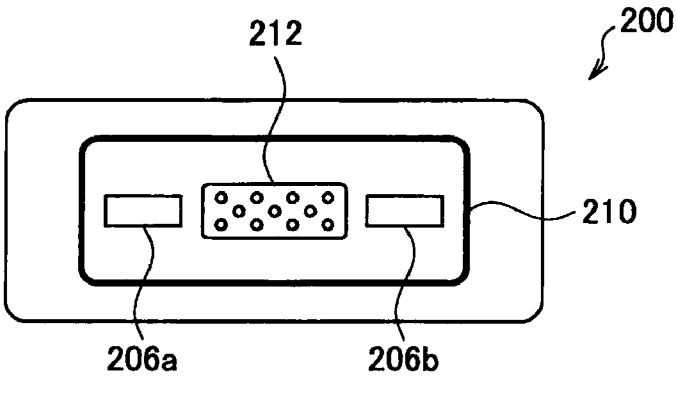
FIG. 7 is an explanatory diagram showing another schematic structure of the transmission connector 200 in the radio frequency signal transmission system according to variant 3.

The radio frequency signal transmission system according to variant 3 can be used along with a traditional electric signal transmission path. FIG. 7 is an explanatory diagram showing another schematic structure of the transmission connector 200 in the radio frequency signal transmission system according to variant 3. In the example of FIG. 7, the transmission connector 200 includes two dielectric bodies 206*a* and 206*b*. The antenna 204 for radiating a millimeter wave is cast in each dielectric body 206*a*, 206*b*. Further, the transmission connector 200 includes an electric signal transmission terminal 212.

Only the transmission connector 200 is shown in FIG. 7, but the transmission cable 300 connected with the transmission connector 200 similarly includes a transmission path formed of two dielectric bodies. Further, the transmission cable 300 includes an electric signal transmission path connected with the electric signal transmission terminal 212 of the transmission connector 200. In other words, the radio frequency signal transmission system shown in FIG. 7 utilizes a traditional electric signal transmission path along with the two dielectric transmission paths, thereby increasing the data transfer capacity and selecting a transmission system depending on a type or capacity of the data to be transferred.

The electric signal transmission terminal 212 shown in FIG. 7 is one example for explaining one characteristic of variant 3, and the present invention is not limited thereto. For example, the shape of the transmission terminal 212, the number of pins, the standard of the transmission terminal and the like are not limited to specific ones. The radio frequency signal transmission system according to variant 3 can be used along with not only the electric signal transmission system but also an optical signal communication path.

As stated above, the radio frequency signal transmission system according to variant 3 includes multiple radio frequency signal transmission paths described in the above embodiment, thereby increasing the capacity of data to be transmitted. Further, the radio frequency signal transmission system according to variant 3 can be used along with the transmission of a radio frequency signal through the radio frequency signal transmission path described in the above embodiment and additionally with a traditional electric signal transmission system and the like. Thus, the data transfer capacity can be increased and additionally the transmission system can be selected depending on a type or capacity of the data to be transferred. Consequently, the radio frequency signal transmission system according to variant 3 can be utilized to realize the transmission of a high-capacity signal at high speed utilizing a radio frequency signal.

[3-4. Variant 4 (Example of Providing Radio Wave Absorbing Member 214 to Restrict Reflected Wave)]

As stated above, in the radio frequency signal transmission system according to the present embodiment, a millimeter wave radiated from the antenna 204 is incident into the dielectric transmission path 302 of the transmission cable 300 via the dielectric body 206 of the transmission connector 200. However, typically, some millimeter waves radiated from the antenna 204 may not only be directly incident in the dielectric transmission path 302 of the transmission cable 300 but also in the dielectric transmission path 302 of the transmission cable 300 after being reflected on a predetermined face of the dielectric body 206 of the transmission connector 200. Such a reflected wave can be a cause for the problem such as so-called ghost phenomenon, which is not preferable for data transfer quality. A radio frequency signal transmission system according to variant 4 can eliminate the problem. Specifically, the radio frequency signal transmission system according to variant 4 includes the radio wave absorbing member 214 at a predetermined face of the dielectric body 206 of the transmission connector 200, thereby restricting a decrease in the transmission quality due to a reflected wave.

Figure 8:
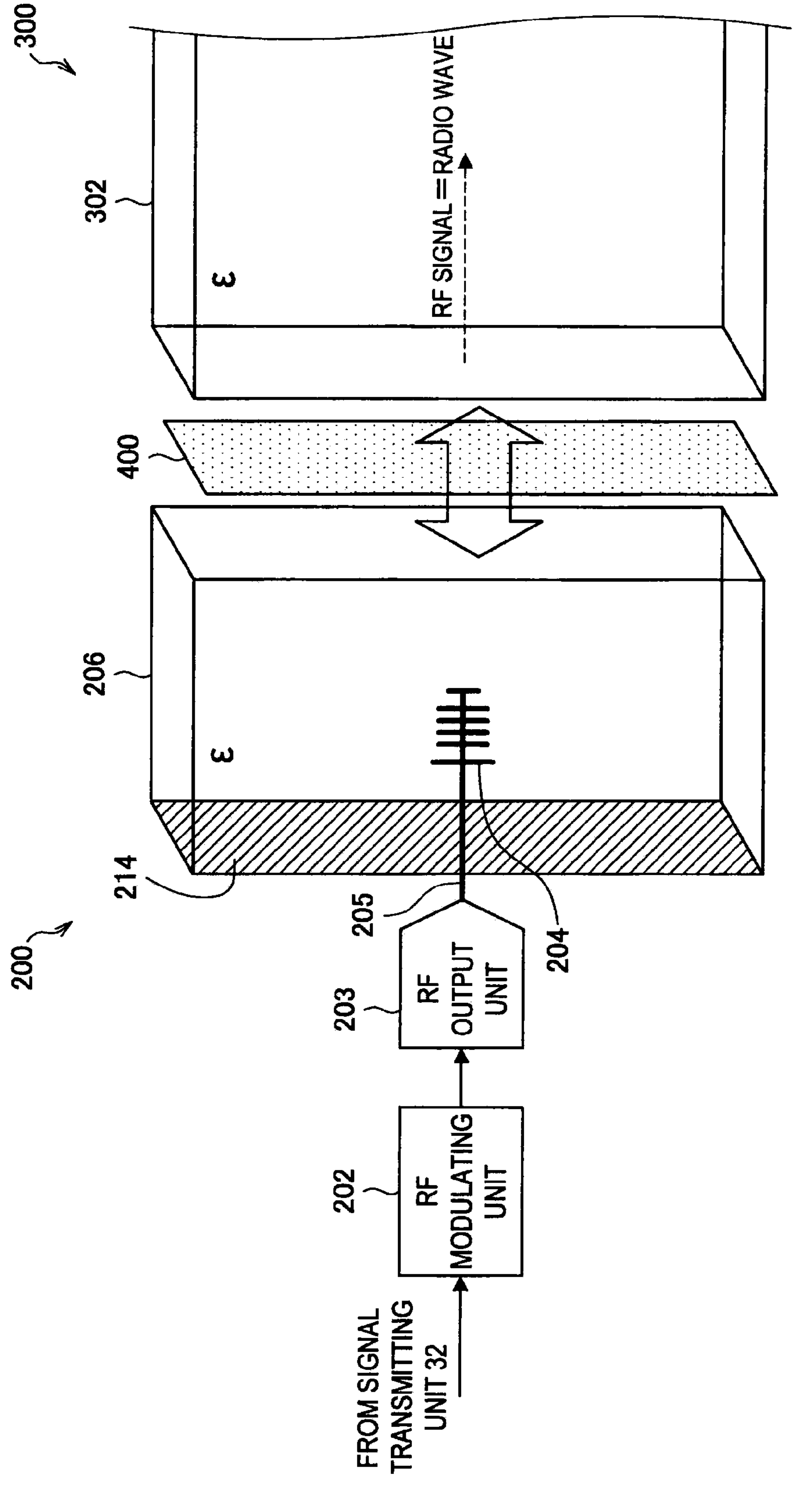
FIG. 8 is an explanatory diagram showing a schematic structure of a radio frequency signal transmission system according to variant 4.

FIG. 8 is an explanatory diagram showing a schematic structure of the radio frequency signal transmission system according to variant 4. As shown in FIG. 8, the transmission connector 200 includes the radio wave absorbing member 214 at one face of the dielectric body 206. The radio wave absorbing member 214 can use a ferrite-based magnetic material or a polymer material such as polyether, but is not limited to a specific material as long as it can absorb a millimeter wave radiated from the antenna 204.

With the structure shown in FIG. 8, some millimeter waves radiated toward the radio wave absorbing member 214 among the millimeter waves radiated from the antenna 204 are absorbed in the radio wave absorbing member 214. In other words, a millimeter wave can be prevented from reflecting on the face on which the radio wave absorbing member 214 is provided. Consequently, a ghost phenomenon occurring due to an influence of the reflected wave can be alleviated, thereby restricting a decrease in the transmission quality.

The structure of the radio frequency signal transmission system shown in FIG. 8 is one example for explaining one characteristic of variant 4, and the present invention is not limited thereto. For example, the radio wave absorbing member 214 may be provided on multiple faces of the dielectric body 206 and the size or position of the radio wave absorbing member 214 is not limited to the example shown in FIG. 8.

[3-5. Variant 5 (Example of Transmitting Data Recorded in IC Chip 500)]

The transmission connector 200 in the radio frequency signal transmission system described in the above embodiment is one example for explaining the above embodiment, and the structure, shape and the like of the transmission connector 200 can be variously modified depending on a capacity of data to be transmitted or a type of an electronic device to be connected. In the following, there will be described a radio frequency signal transmission system according to variant 5 capable of being applied to the transfer of the data recorded in an IC chip.

Figure 9:
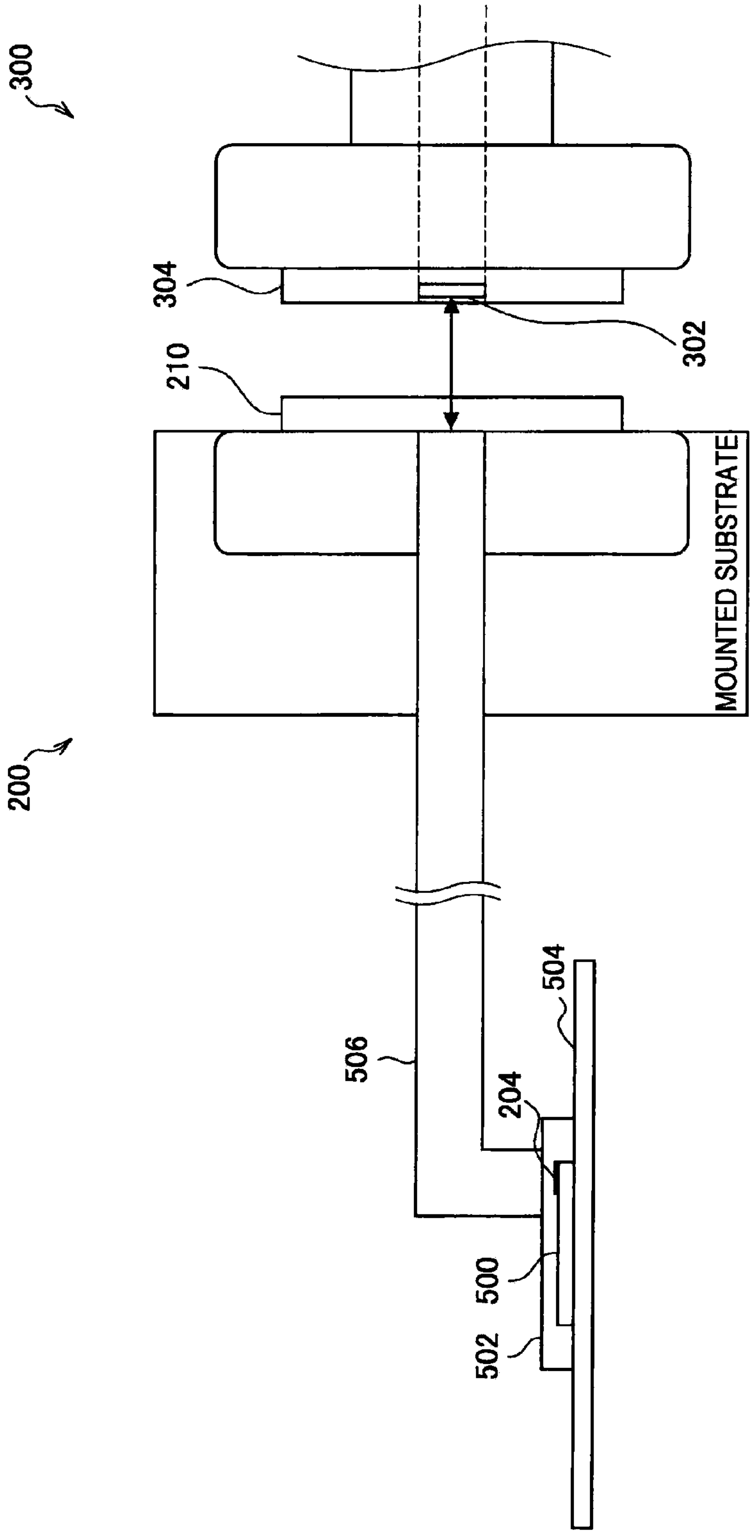
FIG. 9 is an explanatory diagram showing a schematic structure of a radio frequency signal transmission system according to variant 5.

FIG. 9 is an explanatory diagram showing a schematic structure of the radio frequency signal transmission system according to variant 5. FIG. 9 shows a structure example of the radio frequency signal transmission system when transmitting the data recorded in the IC chip 500 to another electronic device or the like via a dielectric body.

As shown in FIG. 9, the antenna 204 is arranged on the IC chip 500 provided on a wiring substrate 504. The IC chip 500 and the antenna 204 are embedded in an IC package 502. The IC package 502 is made of a resin material, for example, and can contain the IC chip 500 and the antenna 204 therein through the molding. The IC package 502 is connected with a dielectric transmission path 506 made of a dielectric body having a predetermined permittivity. The dielectric transmission path 506 is formed to be extended to the transmission connector 200, and is contacted with the dielectric transmission path 302 of the transmission cable 300 during the connection between the transmission connector 200 and the transmission cable 300.

A permittivity of the dielectric transmission path 302 of the transmission cable 300, a permittivity of the dielectric transmission path 506 of the transmission connector 200, and a permittivity of the IC package 502 are set to be substantially the same, thereby efficiently transmitting a millimeter wave radiated from the antenna 204. In other words, since the permittivity of the IC package 502 is substantially the same as the permittivity of the dielectric transmission path 506, the attenuation of a millimeter wave can be restricted at the contact face between the IC package 502 and the dielectric transmission path 506. Further, the attenuation of a millimeter wave can be restricted similarly also at the contact face between the dielectric transmission path 506 and the dielectric transmission path 302 of the transmission cable 300. Consequently, the radio frequency signal transmission system according to variant 5 shown in FIG. 9 is used so that a millimeter wave can be utilized to efficiently transmit the high-capacity data recorded in the IC chip 500 at high speed.

Figure 10:
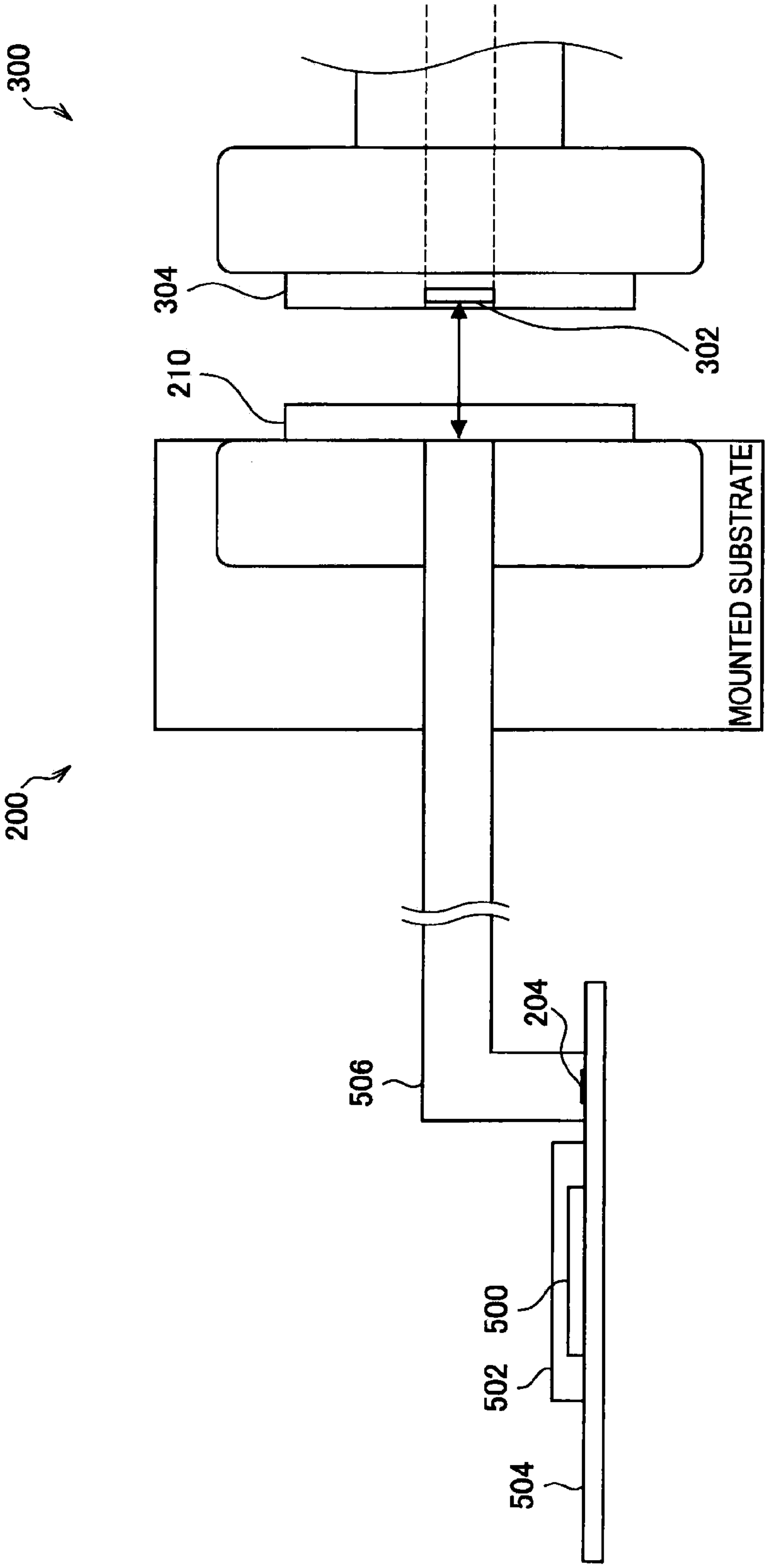
FIG. 10 is an explanatory diagram showing another schematic structure of the radio frequency signal transmission system according to variant 5.

FIG. 10 is an explanatory diagram showing another schematic structure of the radio frequency signal transmission system when transmitting the data recorded in the IC chip 500 via a dielectric body to another electronic device or the like.

In the example shown in FIG. 10, the IC chip 500 provided on the wiring substrate 504 is embedded in the IC package 502. The antenna 204 is arranged on the wiring substrate 504 and cast in the dielectric transmission path 506. With the structure, a millimeter wave radiated from the antenna 204 is transmitted through the dielectric transmission path 506 and then transmitted to the dielectric transmission path 302 of the transmission cable 300. Similarly to the above example, the permittivity of the dielectric transmission path 302 of the transmission cable 300 is set to be substantially the same as the permittivity of the dielectric transmission path 506 of the transmission connector 200, thereby efficiently transmitting the millimeter wave radiated from the antenna 204. In other words, attenuation of the millimeter wave at the contact face between the dielectric transmission path 506 and the dielectric transmission path 302 of the transmission cable 300 can be restricted. Consequently, the radio frequency signal transmission system according to variant 5 shown in FIG. 10 is utilized so that a millimeter wave can be used to efficiently transmit the high-capacity data recorded in the IC chip 500 at high speed.

4. CONCLUSIONS

As described above, in the radio frequency signal transmission system according to the present embodiment, the antenna 204 provided in the transmission connector 200 is cast in the dielectric body 206. There is configured such that the permittivity of the dielectric body 206 is set to be substantially the same as the permittivity of the dielectric body configuring the dielectric transmission path 302 of the transmission cable 300. Thus, a millimeter wave radiated from the antenna 204 can be restricted from attenuating at the contact face between the transmission connector 200 and the transmission cable 300. Further, the radio frequency signal transmission system according to the present embodiment can include the buffer 400 at the contact face between the dielectric body 206 of the transmission connector 200 and the dielectric transmission path 302 of the transmission cable 300. Thus, the dielectric body 206 of the transmission connector 200 is connected with the dielectric transmission path 302 of the transmission cable 300 via the buffer 400, thereby improving the tightness between the dielectric body 206 and the dielectric transmission path 302. The permittivity of the buffer 400 is set to be substantially the same as the permittivities of the dielectric body 206 and the dielectric body configuring the dielectric transmission path 302, thereby restricting the attenuation of a millimeter wave at the contact face between the dielectric body 206 and the dielectric transmission path 302. Further, in the radio frequency signal transmission system according to the present embodiment, the transmission connector 200 and the transmission cable 300 can have a fit structure, respectively. Thus, it is possible to further improve the accuracy of the contact position between the dielectric body 206 and the dielectric transmission path 302 during the connection between the transmission connector 200 and the transmission cable 300. Moreover, in the radio frequency signal transmission system according to the present embodiment, the radio wave absorbing member 214 can be provided at a predetermined face of the dielectric body 206 of the transmission connector 200. Thus, the reflection of a millimeter wave radiated from the antenna 204 can be restricted, thereby improving the data transfer quality. As described above, the radio frequency signal transmission system according to the present embodiment can realize the high-speed and high-capacity signal transmission utilizing a radio frequency signal.

It should be understood by those skilled in the art that various modifications, combinations, sub-combinations and alterations may occur depending on design requirements and other factors insofar as they are within the scope of the appended claims or the equivalents thereof.

For example, there has been mainly described in the above embodiment a millimeter wave having a frequency band of 30

GHz to 300 GHz as one example of a radio frequency signal, but the present invention is not limited thereto. For example, the radio frequency signal transmission system having the above structure is utilized to transmit a radio frequency signal having another frequency band. Of course, the frequency band of the radio frequency signal, and the characteristics or specification of the antenna for radiating the radio frequency signal are appropriately selected depending on the data transfer capacity, transfer speed, quality, cost and the like required for the transmission system.

The material nature, permittivity, shape, size and the like of the dielectric body in the present embodiment are not limited to the above example. In other words, as long as the permittivity of the dielectric body 206 of the transmission connector 200 is set to be substantially the same as the permittivity of the dielectric body configuring the dielectric transmission path 302 of the transmission cable 300, thereby restricting the signal attenuation at the contact face between the dielectric body 206 and the dielectric transmission path 302, the permittivities are not limited to a specific permittivity.

The present application contains subject matter related to that disclosed in Japanese Priority Patent Application JP 2009-002852 filed in the Japan Patent Office on 8 Jan. 2009, the entire content of which is hereby incorporated by reference.

What is claimed is:

1. A radio frequency signal transmission system comprising:

a radio frequency signal transmission connector including an antenna for radiating a radio frequency signal having a predetermined frequency band, and a first dielectric body made of a material having a predetermined first permittivity and having the antenna cast therein; and a radio frequency signal transmission cable including a dielectric transmission path formed of a second dielectric body made of a material having substantially the same second permittivity as the first permittivity of the first dielectric body of the radio frequency signal transmission connector, wherein the radio frequency signal transmission connector is connected with the radio frequency signal transmission cable thereby to form a radio frequency signal transmission path through which the radio frequency signal radiated from the antenna is transmitted to the dielectric transmission path via the first dielectric body.

2. The radio frequency signal transmission system according to claim 1, wherein the first dielectric body of the radio frequency signal transmission connector is connected with the dielectric transmission path of the radio frequency signal transmission cable via a buffer, and a permittivity of the buffer is substantially the same as the first permittivity and the second permittivity.

3. The radio frequency signal transmission system according to claim 2, wherein the radio frequency signal transmission connector and the radio frequency signal transmission cable further include a fit structure in which they are fit with each other during their connection, and the fit structures are fit with each other when the radio frequency signal transmission connector and the radio frequency signal transmission cable are connected, thereby a contact face between the first dielectric body and the dielectric transmission path is positioned.

4. The radio frequency signal transmission system according to claim 3, wherein the radio frequency signal transmission connector further includes a radio wave absorbing member for absorbing a radio frequency signal radiated from the antenna on a predetermined face of the first dielectric body.

5. The radio frequency signal transmission system according to claim 1, wherein the radio frequency signal transmission connector includes multiple antennas and first dielectric bodies and the radio frequency signal transmission cable includes multiple dielectric transmission paths to form multiple radio frequency signal transmission paths.

6. The radio frequency signal transmission system according to claim 5, wherein the radio frequency signal transmission connector and the radio frequency signal transmission cable further include an electric signal transmission path.

7. The radio frequency signal transmission system according to claim 5, wherein the radio frequency signal transmission connector and the radio frequency signal transmission cable further include an optical signal transmission path.

8. The radio frequency signal transmission system according to claim 1, wherein the radio frequency signal is a millimeter wave having a frequency band of 30 GHz to 300 GHz.

9. The radio frequency signal transmission system according to claim 8, wherein the first permittivity and the second permittivity are about 2.2 to 2.6.

10. A radio frequency signal transmission connector which is connected with a radio frequency signal transmission cable including a dielectric transmission path configured with a first dielectric body made of a material having a predetermined first permittivity, comprising:

an antenna for radiating a radio frequency signal having a predetermined frequency band; and a second dielectric body made of a material having substantially the same second permittivity as the first permittivity and having the antenna cast therein.

11. The radio frequency signal transmission connector according to claim 10, further comprising a buffer made of a material having substantially the same permittivity as the first permittivity and the second permittivity at a face of the second dielectric body contacting with the dielectric transmission path.

12. The radio frequency signal transmission connector according to claim 11, further comprising a fit structure which is fit with a fit structure provided in the radio frequency signal transmission cable to position the second dielectric body contacting with the dielectric transmission path during the connection with the radio frequency signal transmission cable.

13. The radio frequency signal transmission connector according to claim 12, further comprising a radio wave absorbing member for absorbing a radio frequency signal radiated from the antenna on a predetermined face of the second dielectric body.

14. The radio frequency signal transmission connector according to claim 10, comprising multiple second dielectric bodies having the antenna cast therein.

15. The radio frequency signal transmission connector according to claim 10, wherein the radio frequency signal is a millimeter wave having a frequency band of 30 GHz to 300 GHz.

16. The radio frequency signal transmission connector according to claim 15, wherein the first permittivity and the second permittivity are about 2.2 to 2.6.

17. A radio frequency signal transmission cable which is connected with a radio frequency signal transmission connector including a first dielectric body made of a material having a predetermined first permittivity and having cast therein an antenna for radiating a radio frequency signal having a predetermined frequency band, comprising:

a dielectric transmission path formed of a second dielectric body made of a material having substantially the same second permittivity as the first permittivity.

18. The radio frequency signal transmission cable according to claim 17, further comprising a buffer made of a material having substantially the same permittivity as the first permittivity and the second permittivity at a face of the dielectric transmission path contacting with the first dielectric body.

19. The radio frequency signal transmission cable according to claim 18, further comprising a fit structure which is fit with a fit structure provided in the radio frequency signal transmission connector to position the dielectric transmission path contacting with the first dielectric body during the connection with the radio frequency signal transmission connector.

20. The radio frequency signal transmission cable according to claim 17, wherein the first permittivity and the second permittivity are about 2.2 to 2.6.

* * * * *